US 10,649,851 B2

(12) United States Patent
Sorenson

(10) Patent No.: US 10,649,851 B2
(45) Date of Patent: May 12, 2020

(54) EXTRACTION OF AUDIT TRAILS

(71) Applicant: Unisys Corporation, Blue Bell, PA (US)

(72) Inventor: Ellen L Sorenson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 112 days.

(21) Appl. No.: 15/132,644

(22) Filed: Apr. 19, 2016

(65) Prior Publication Data

US 2017/0300257 A1    Oct. 19, 2017

(51) Int. Cl.
*G06F 11/14*    (2006.01)
*G06F 3/06*    (2006.01)

(52) U.S. Cl.
CPC ........ *G06F 11/1451* (2013.01); *G06F 3/0619* (2013.01); *G06F 3/0622* (2013.01); *G06F 3/0659* (2013.01); *G06F 3/0686* (2013.01)

(58) Field of Classification Search
CPC .... G06F 3/0619; G06F 3/0622; G06F 3/0659; G06F 3/0686; G06F 11/1451
See application file for complete search history.

(56) References Cited

U.S. PATENT DOCUMENTS

| | | | |
|---|---|---|---|
| 6,415,095 B1* | 7/2002 | Morishima | G11B 27/034 386/200 |
| 6,539,402 B1* | 3/2003 | Sorenson | G06F 11/1471 |
| 8,214,370 B1* | 7/2012 | Turon | G06F 16/2228 707/741 |
| 2010/0145905 A1* | 6/2010 | Sepielli | G06F 17/30241 707/609 |
| 2011/0161132 A1* | 6/2011 | Goel | G06Q 10/06 705/7.26 |
| 2012/0030440 A1* | 2/2012 | Miwa | G06F 3/0617 711/162 |

* cited by examiner

*Primary Examiner* — Aracelis Ruiz

(57) ABSTRACT

A method includes receiving, at a processor, a timestamp as a start-point for extracting information from the storage tape. The method further includes determining, by the processor, a reel identification and a device type of a storage tape. The method further includes extracting the information, by the processor, from the storage tape starting at the start-point. The method further includes determining, by the processor, whether an end-point of the information has been reached. The method further includes reproducing, by the processor, the information to a computer-readable medium. The method further includes formatting, by the processor, the information to conform with format requirements of an activity log analyzing tool.

17 Claims, 10 Drawing Sheets

```
>@IRU, a
Integrated Recovery Utility 23R1 (150701-141853) 2015/07/01 14:19:54 CDT
Copyright(c) 2015 Unisys Corporation.          605
                                                                                  610
> extract move reel t17464 type vts; act appl appone;
ACT set is for application 1  ~ 615
                              620
                                  625            630
Audit reel T17464 assigned
                                                                            635
Extracting F-cycle 394 to file VTST17464*IRU$EX01-394(+1)
Extracting F-cycle 395 to file VTST17464*IRU$EX01-395(+1)
Extracting F-cycle 396 to file VTST17464*IRU$EX01-396(+1)
Extracting F-cycle 397 to file VTST17464*IRU$EX01-397(+1)
Extracting F-cycle 398 to file VTST17464*IRU$EX01-398(+1)      645
Audit reel T17464 freed  ~ 640
Timestamp of last block extracted: 2015/06/15 14:40:58 CDT FCYCLE Table Summary                                                        650
Position  Fcycle  Start Time              Start TBSN  Status 001     394     2015/06/15 14:40:29 CDT       9619  Partial
  002     395     2015/06/15 14:40:30 CDT       9802  Extracted
  003     396     2015/06/15 14:40:37 CDT      12226  Extracted
  004     397     2015/06/15 14:40:44 CDT      14651  Extracted
  005     398     2015/06/15 14:40:52 CDT      17076  Incomplete
> end Alternate print file IRU$AF5NOS(2) available
End IRU Errors 0 Warnings 0

```
>@IRU,a
Integrated Recovery Utility 23R1 (150701-141853) 2015/07/01 14:19:54 CDT
Copyright(c) 2015 Unisys Corporation.
> Extract audit from time 2015/06/15 14:40:37; act appl appone;
ACT set is for application [    ]
Audit reel T17464 assigned
Extracting F-cycle 396 to file VTST17464*IRU$EX01-396(+1)
Audit reel T17464 freed
Timestamp of last block extracted: 2015/06/15 14:40:44 CDT FCYCLE Table Summary
 Position  Fcycle  Start Time               Start TBSN   Status
   001      394    2015/06/15 14:40:29 CDT       9619    Skipped
   002      395    2015/06/15 14:40:30 CDT          0    Skipped
   003      396    2015/06/15 14:40:37 CDT      12226    Extracted
> end Alternate print file IRU$AF5NOS(3) available
End IRU Errors 0 Warnings 0
```

FIG. 7

EXTRACTION OF AUDIT TRAILS

FIELD OF THE DISCLOSURE

The instant disclosure relates generally to database management. More specifically, this disclosure relates to embodiments of apparatuses, systems, and methods that extract information from storage tape.

BACKGROUND

The activities performed by users on a database are generally recorded in activity logs. When there is an interruption of the normal functioning of the database, reviewing the activity logs may be needed to troubleshoot the issue. The activity logs are not always kept on the database servers and sometimes are transferred to storage tapes for permanent storages. An audit trail refers to a part or whole activity log transferred from a database server to a storage tape.

It is possible that when an interruption of a database service happens, the relevant activity logs have already been deleted from the database and transferred to storage tapes. Reviewing audit trails on the storage tapes, thus, may be needed to pinpoint the issues causing the interruption. Specialized third party companies are often hired by database administrators for reviewing the activity logs. However, database administrators may tightly regulate the physical access of the storage tapes and may be reluctant to physically transport the storage tapes to the specialized third party companies. These characteristics of storage tapes make database troubleshooting difficult. Embodiments of the invention and their equivalents disclosed herein may provide alternative solutions.

SUMMARY

The instant disclosure relates generally to database management. More specifically, this disclosure relates to embodiments of apparatuses, systems, and methods that extract information from storage tape. According to one embodiment, a method includes receiving, at a processor, a first timestamp. The method further includes determining, at the processor, a start-point for extracting information from a storage tape according to the first timestamp. The method further includes extracting the information, by the processor, from the storage tape starting at the start-point. The method further includes determining, by the processor, whether an end-point of the information has been reached. The method further includes writing, by the processor, the information extracted to a computer-readable medium. The method further includes formatting, by the processor, the information extracted to conform with format requirements of an endpoint application.

According to one embodiment, a computer program product includes a non-transitory computer-readable medium comprising instructions which, when executed by a processor of a computing system, cause the processor to perform the step of receiving a first timestamp; determining a start-point for extracting information from the storage tape according to the first timestamp; extracting the information from the storage tape starting at the start-point; determining whether an end-point of the information has been reached; writing the information extracted to a computer-readable medium; and formatting the information extracted to conform with format requirements of an endpoint application.

According to one embodiment, an apparatus includes a memory and a processor coupled to the memory. The processor is configured to execute the step of receiving a first timestamp; determining a start-point for extracting information from the storage tape according to the first timestamp; extracting the information from the storage tape starting at the start-point; determining whether an end-point of the information has been reached; writing the information extracted to a computer-readable medium; and formatting the information extracted to conform with format requirements of an endpoint application.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. It is noted that the embodiments of the invention disclosed herein may be useful to extract information not only from audit trails, but also from general system activity logs, metered system activity audit trail, and the performance monitor logs.

BRIEF DESCRIPTION OF THE DRAWINGS

For a more complete understanding of the disclosed systems and methods, reference is now made to the following descriptions taken in conjunction with the accompanying drawings.

FIG. 6 is an example of an instruction that extracts all F-cycles from a storage tape and the execution results of the instruction according to one embodiment.

FIG. 7 is an example of an instruction that extracts information from a storage tape and the execution results of the instruction according to one embodiment of the disclosure.

DETAILED DESCRIPTION

Figure 1:
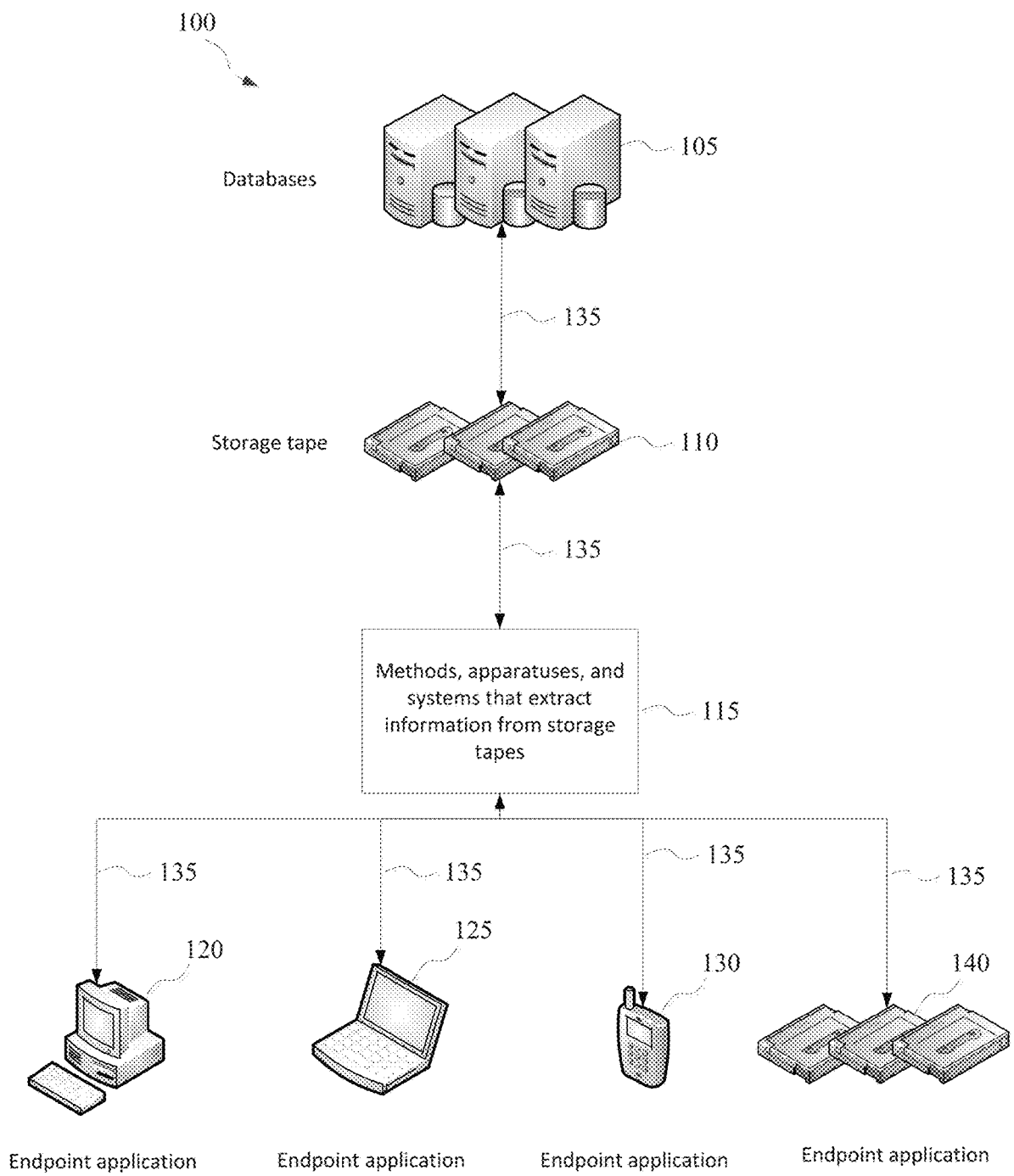
FIG. 1 is a schematic diagram of a review process of activity logs that involves methods, apparatuses, and systems that extract information from storage tapes according to one embodiment of the disclosure.

A "storage tape" is a massive data storage device. A storage tape may be a magnetic storage medium for massive data storage, backup, archiving, and data interchange. A storage tape may be a computer-readable medium. A storage tape may also be a non-transient computer-readable medium. A storage tape may be a magnetic tape, in contrast to a magnetic disk (e.g., a hard disk). A storage tape may also be a sequential access medium, which means that reading or writing a storage tape must be sequential. Storage tapes may have different format requirements depending on the brand names and types. Reading a storage tape requires a matching reading apparatus, e.g., a tape drive.

An "audit trail" refers to a log of activities performed on a database stored on one or more storage tapes. An audit trail may include a chronological record of which user has done what on the database. One audit trail may be very large. Thus, one audit trail may be recorded across two or more storage tapes.

An "F-cycle" is an instance of a mass storage file, e.g., an audit trail, a general system log, or the like. A mass storage file may include multiple F-cycles. In one embodiment, a mass storage file, e.g., an audit trail, may include as many as 999 F-cycles. In one embodiment of an OS2200 system, a mass storage file, e.g., an audit trail, may include less than 32 F-cycles. "F-cycle" may also be referred as "FCYCLE" or "fcycle."

A "mass storage file" may be an electronic file created for storing one or more F-cycles extracted from one or more storage tapes. A mass storage file may be created on a computer-readable medium other than a storage tape, e.g., a hard disk. A mass storage file may be transmitted through a data connection, e.g., Internet. One mass storage file may include less, equal, or more than one F-cycle. Embodiments of this disclosure focus on examples that one mass storage file maps to one F-cycle. It is noted that the embodiments of this disclosure are exemplary only and do not provide any limitation to the true scope of the invention.

An "endpoint application" means any suitable application that may find the information extracted from a storage tape useful. In one embodiment, an endpoint application may be a log reviewing software. A log reviewing software may be, for example, free standing audit handler (FSAH), Integrated Recovery Utility (IRU), Log Analysis (LA), ALog Converter (ALOG), TeamQuest log analyzer (TQLA) or any log reviewing tool developed by an individual, an organization, or a company. A log reviewing software may be executed on various emulated or non-emulated operating systems, e.g., OS2200, Windows, Unix, etc, and various apparatuses, e.g., servers, desktop computers, laptop computer, tablet, mobile phone, etc. In another embodiment, an endpoint application may be a storage tape. In some situations, a user may desire to reconstruct one storage tape by using the extracted information from another storage tape.

A "data connection" may be an electrical or magnetic signal connection that communicates electronic information. A data connection may be established through a wired connection, e.g., USB, Ethernet, local area network, etc. A data connection may also be established through a wireless connection, e.g., IEEE 802.11× (WiFi), long term evolution (4G LTE), or the like.

The term "instruction" means a processor-executable instruction, for example, an instruction written as programming codes. An instruction may be executed by any suitable processor, for example, x86 processor. An instruction may be programmed in any suitable computer language, for example, machine codes, assembly language codes, C language codes, C++ language codes, Fortran codes, Java codes, Matlab codes, or the like.

FIG. 1 is a schematic diagram of a review process 100 of activity logs that involves methods, apparatuses, and systems that extract information from storage tapes 115. The methods, apparatuses, and systems that extract information from storage tapes 115 may include the working process 200 shown in FIG. 2. The review process 100 may include the method 300 shown in FIG. 3. The review process 100 may include the method 400 shown in FIG. 4. The review process 100 may include the examples 500 and 550 of instructions to extract information from a storage tape as shown in FIG. 5A and FIG. 5B, respectively. The review process 100 may include the example 600 of an instruction to extract information from a storage tape as shown in FIG. 6. The review process 100 may include the example 700 of an instruction to extract information from a storage tape as shown in FIG. 7. The review process 100 may be included in the computer network 800 shown in FIG. 8 The review process 100 may be included in the computer system 900 shown in FIG. 9. The review process 100 may be included in the server 1000 shown in FIG. 10A and/or the server 1050 shown in FIG. 10B.

As shown in FIG. 1, the review process 100 of activity logs includes databases 105, storage tapes 110, and methods, apparatuses, and systems that extract information from storage tapes 115. The review process 100 further includes various endpoint applications 120, 125, 130, and 140, e.g., log reviewing tools, running on desktop computer, laptop computer, and/or mobile phone. The review process 100 further includes an endpoint application 140 that is a storage tape 140. In one embodiment, the endpoint application 140 is to reconstruct one storage tape by using extracted information from another storage tape. The databases 105 and the storage tapes 110 are connected through a data connection 135. The storage tapes 110 and the methods, apparatuses, and systems that extract information from storage tapes 115 are also connected through a data connection 135. Various endpoint applications 120, 125, 130, and 140 are each individually connected to the methods, apparatuses, and systems that extract information from storage tapes 115 through a data connection 135.

In another embodiment, a database 105 may keep an activity log. The activity log may include log entries recorded in a chronological order. Each activity and/or event may be recorded in the activity log organized according to the time the activity and/or event happened. Each event recorded in an F-cycle may include a timestamp.

In another embodiment, the activity log kept by the database 105 may be archived in a storage tape 110. The activity log transferred may be stored in a storage tape 110 as an audit trail. In one embodiment, the audit trail stored in a storage tape 105 may be a permanent backup of the activity log. The audit trail may be needed at a later time for troubleshooting the database. It is noted that the review process 100 is not limited to database 105 and storage tape 110. In one embodiment, 105 may be a general system, and 110 may be an activity log of the general system.

In another embodiment, methods, apparatuses, and systems that extract information from storage tapes 115 may be used to extract a part of the audit trail. In another embodiment, methods, apparatuses, and systems that extract information from storage tapes 115 may be used to extract a complete audit trail. In another embodiment, methods, apparatuses, and systems that extract information from storage tapes 115 may be used to extract more than one audit trails.

The extracted audit trails may be stored as one or more mass storage files in a computer-readable medium. In one embodiment, the mass storage file may be transmitted through a data connection, e.g., Internet, to different users. Different endpoint applications 120, 125, 130, and 140 may run on different platforms, e.g., server, desktop computer, laptop computer, mobile phone, or the like. Different endpoint applications 120, 125, 130, and 140 may review the mass storage file using different log reviewing software running on different operating systems. Different log reviewing software may include, for example, free standing audit handler (FSAH), Integrated Recovery Utility (IRU), Log Analysis (LA), ALog Converter (ALOG), TeamQuest log analyzer (TQLA) or any other log reviewing tools. Different operating systems may include OS 2200, Unix, Linux, Windows, iOS, Android, or the like. The review process 100 further includes an endpoint application 140 that is a storage tape 140. In one embodiment, the endpoint application 140 is to reconstruct one storage tape by using extracted information from another storage tape.

In yet another embodiment, different log reviewing software may have different format requirements, e.g, number of columns, number of rows, length of each data string, header format, end of file format, or the like. In one embodiment, the methods, apparatuses, and systems that extract information from storage tapes 115 may reformat the extracted information to conform with the format requirements of different log reviewing software, e.g., FSAH, IRU, LA, ALOG, TQLA, ASCII Log Audit Trail (ALAT), or the like. In yet another embodiment, the methods, apparatuses, and systems that extract information from storage tapes 115 may package the extracted information as an executable file (for example, .exe file, autorun file, or the like) that can be viewed by itself without a separate log reviewing software.

In yet another embodiment, the information extracted by the methods, apparatuses, and systems that extract information from storage tapes 115 may include user name, activity name (open, swap, close, read, write, etc), timestamp of each activity, trail block sequence number (TBSN), or the like.

In one embodiment, different endpoint applications 120, 125, 130, and 140, may review extracted information in different manners, for example usage report organized by program, run, transaction, devices, media symbionts, and security. In another embodiment, users of different endpoint applications 120, 125, 130, and 140 may also review summary reports of the extraction process, programs, program response time, projects, user-ids, accounts, or the like.

In one embodiment, the extracted information by the methods, apparatuses, and systems that extract information from storage tapes 115 may be reformatted and reconstructed as different audit trails that conform with the format requirements of different types of storage tapes. In another embodiment, the methods, apparatuses and systems that extract information may work as an information processing center that extracts the desired information from audit trail, reformat the information for a desired purposes.

Figure 2:
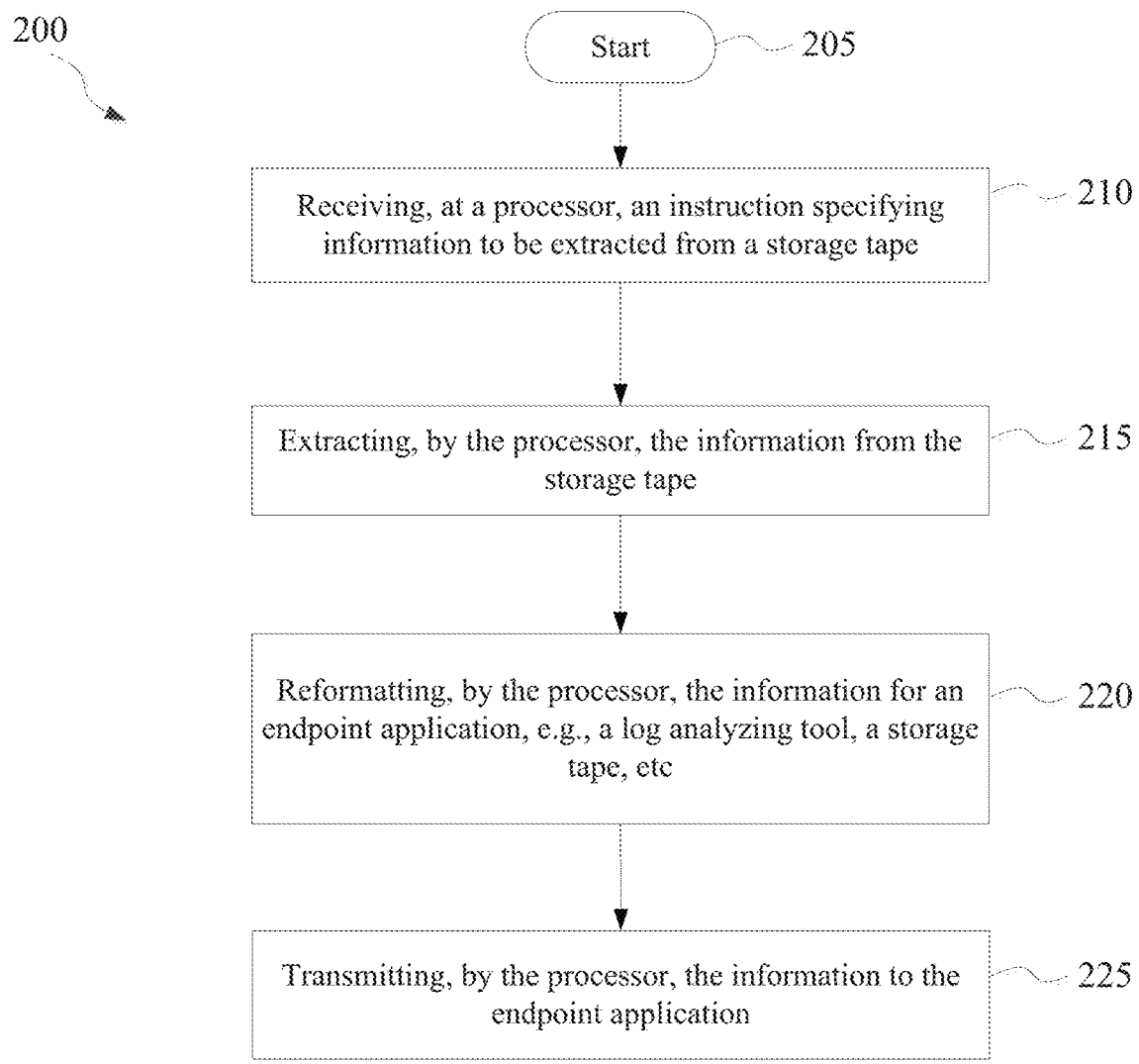
FIG. 2 is a schematic diagram showing a working process of methods, apparatuses, and systems that extract information from storage tapes according to one embodiment of the disclosure.

FIG. 2 is a schematic diagram showing a working process 200 of methods, apparatuses, and systems that extract information from storage tapes. The working process 200 may apply to the methods, apparatuses, and systems that extract information from storage tapes 115 shown in FIG. 1. The working process 200 may include the method 300 shown in FIG. 3. The working process 200 may include the method 400 shown in FIG. 4. The working process 200 may include the examples 500 and 550 of instructions to extract information from a storage tape as shown in FIG. 5A and FIG. 5B, respectively. The working process 200 may include the example 600 of an instruction to extract information from a storage tape as shown in FIG. 6. The working process 200 may include the example 700 of an instruction to extract information from a storage tape as shown in FIG. 7. The working process 200 may be included in the computer network 800 shown in FIG. 8 The working process 200 may be included in the computer system 900 shown in FIG. 9. The working process 200 may be included in the server 1000 shown in FIG. 10A and/or the server 1050 shown in FIG. 10B.

As shown in FIG. 2, the working process 200 starts at 205. The working process 200 proceeds to block 210, which includes receiving, at the processor, an instruction specifying information to be extracted from a storage tape. The working process 200 proceeds to block 215, which includes extracting, by the processor, the information from the storage tape. The working process 200 proceeds to block 220, which includes reformatting, by the processor, the information for an endpoint, e.g., a log analyzing tool, a storage tape, etc. The working process 200 proceeds to block 225, which includes transmitting, by the processor, the information to the endpoint.

At block 210, the instruction may include a start-point and/or an end-point of the information to be extracted from a storage tape. The instruction may include a first timestamp as a start-point and/or a second timestamp as an end-point. The instruction may include an F-cycle number. The instruction may include a specific position of an audit trail. The instruction may include a starting position of an audit trail. The instruction may be in any appropriate form specifying the desired information to be extracted from a storage tape.

At block 215, the information extracted from the storage tape may be a part of one audit trail, a single complete audit trail, parts of two or more audit trails, or two or more complete audit trails.

At block 220, the reformatting may be made for different endpoints, for example, different log analyzing tools, so that the format of the information can be properly read by the specific log analyzing tools. In some embodiments, the log analyzing tools may be FSAH, IRU, LA, ALOG, TQLA, or the like. In another embodiment at block 220, different endpoints may be different storage tapes. Thus, the reformatting may be made to conform with specific format requirements of different audit trails.

Figure 3:
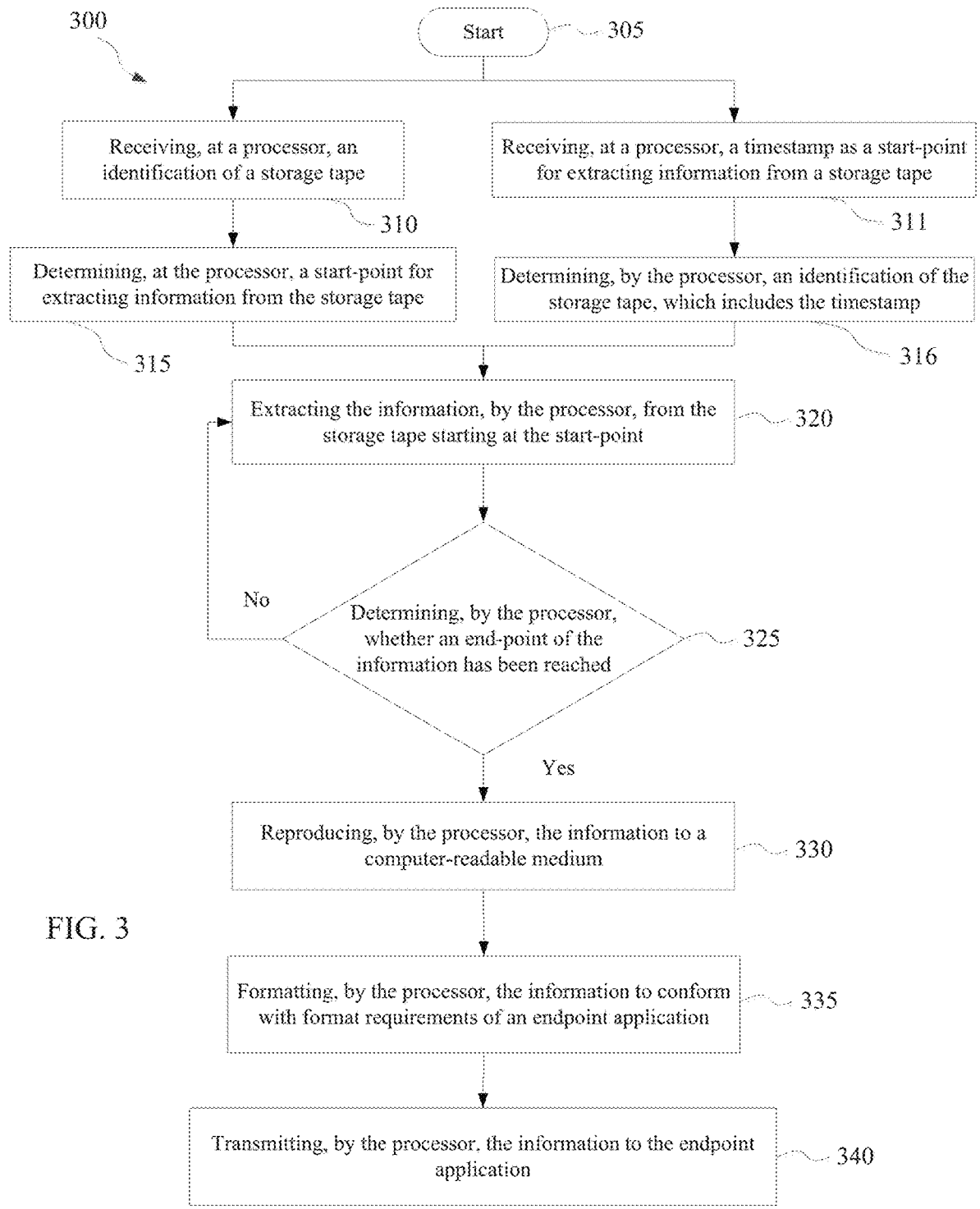
FIG. 3 is a flow chart illustrating a method of extracting information from a storage tape according to one embodiment of the disclosure.

FIG. 3 is a flow chart illustrating a method 300 of extracting information from a storage tape according to one embodiment of the disclosure. The method 300 may apply to the methods, apparatuses, and systems that extract information from storage tapes 115 shown in FIG. 1. The method 300 may be included in the working process 200 shown in FIG. 2. The method 300 may be used in part of or in combination with the method 400 shown in FIG. 4. The method 300 may include the examples 500 and 550 of instructions to extract information from a storage tape as shown in FIG. 5A and FIG. 5B, respectively. The method 300 may include the example 600 of an instruction to extract information from a storage tape as shown in FIG. 6. The method 300 may include the example 700 of an instruction to extract information from a storage tape as shown in FIG. 7. The method 300 may be included in the computer network 800 shown in FIG. 8 The method 300 may be included in the computer system 900 shown in FIG. 9. The method 300 may be included in the server 1000 shown in FIG. 10A and/or the server 1050 shown in FIG. 10B.

As shown in FIG. 3, the method 300 starts at block 305. The method 300 proceeds to either block 310 or block 311. If the method proceeds to block 310, which includes receiving, at a processor, an identification of a storage tape, the method 300 further proceeds to block 315, which includes determining, at the processor, a start-point for extracting information from the storage tape. If the method proceeds to block 311, which includes receiving, at the processor, a timestamp for starting to extract information from a storage tape, the method 300) further proceeds to block 316, which includes determining, by the processor, an identification of the storage tape, which includes the timestamp. The method 300 proceeds to block 320, which includes extracting the information, by the processor, from the storage tape starting at the start-point. The method 300 proceeds to block 325, which includes determining, by the processor, whether an end-point of the information has been reached. The method 300 proceeds to block 330, which includes reproducing, by the processor, the information to a computer-readable medium. The method 300 proceeds to block 335, which includes formatting, by the processor, the information to conform with format requirements of an endpoint application. The method 300 proceeds to block 340, which includes transmitting, by the processor, the information to the end-point application.

At block 310, the identification of a storage tape may include a serial number, a reel identification number, a tape type identification code, or the like. In one embodiment, the method 300 may process a single storage tape. In another embodiment, the method 300 may process more than one storage tapes simultaneously.

At block 311, the processor receives a timestamp as a start-point for extracting information from a storage tape. In one embodiment, the processor may receive a timestamp as a start-point because a user specifies the timestamp in an instruction. Block 311 followed by block 316 may be used as an alternative embodiment as block 310 followed by block 315. The embodiment of block 311 followed by 316 may be useful when a user knows the time period of the audit trail that he/she wants to review, but does not know the identification of the storage tape that contains the time period at interest.

At block 315, the start-point may be identified using an F-cycle number, a position number, an audit trail serial number, a trail block sequence number (TBSN), a time point, a timestamp, a start of reel, or the like. It is noted any other appropriate identification information may be used to indicate the start-point at block 315.

At block 316, the processor automatically determines the identification of the storage tape, which includes the timestamp. In one embodiment, block 316 allows a user to extract the audit trail at interest without knowing the identification of the storage tape.

At block 320, the method 300 extracts the information from the storage tape starting from the start-point. In one embodiment, the storage tape may have a plurality of F-cycles. The start-point may be at the beginning or in the middle of an F-cycle. In some embodiments, the information extracted at block 320 may be a part of one audit trail, a single complete audit trail, parts of two or more audit trails, or two or more complete audit trails.

At block 325, the method 300 determines whether an end-point of the information has been reached. In one embodiment, the end-point is specified by the user using an F-cycle number, a position number, an audit trail serial number, a trail block sequence number (TBSN), a time point, a timestamp, a start of reel, or the like. In one embodiment, the end-point is specified at the same time the start-point is specified, e.g., at block 315. In some embodiments, an end-point is not specified by a user and is presumed by the method 300 to be the end of F-cycle, audit trail, trail block, a certain partition of the tape, an end of the storage tape, or the like.

At block 325, if an end-point of the information has not been reached, the method 300 proceeds to block 320. If an end-point of the information has been reached, the method 300 proceeds to block 330.

At block 330, the method 300 reproduces the information to a computer-readable medium. In one embodiment, the computer-readable medium may be non-transient computer readable memory. In another embodiment, the reproduction of the information to the computer-readable medium may be deleted after the information is transmitted to an endpoint, for example the endpoints in block 220 as shown in FIG. 2.

At block 335, the method formats and/or reorganizes the format of the extracted information to conform with format requirements of an endpoint application, e.g., an activity log analyzing tool and/or a storage tape. In one embodiment, the activity log analyzing tool may be FSAH, IRU, LA, ALOG, TQLA, or the like. It is noted the previously mentioned log analyzing tools are exemplary only. In one embodiment, the activity log analyzing tool may be any log reviewing software developed by any individual, company, or organization suitable for the purpose. It is also noted, at block 335, the formatting of the extracted information is not limited to conform with log analyzing tools. In one embodiment, the formatting of the extracted information may be for reconstructing storage tapes, e.g., block 220 as shown in FIG. 2. In some embodiments, different storage tapes have different format requirements.

At block 340, the transmission of the information may be done through a data connection.

It is noted that the blocks shown in FIG. 3 do not indicate the chronological sequence to be performed. For example, in one embodiment, formatting extracted information at block 335 may be performed earlier than reproducing the information to a computer-readable medium at 330. In yet another embodiment, both blocks 330 and 335 may be performed after the block 320 yet before the block 325.

Figure 4:
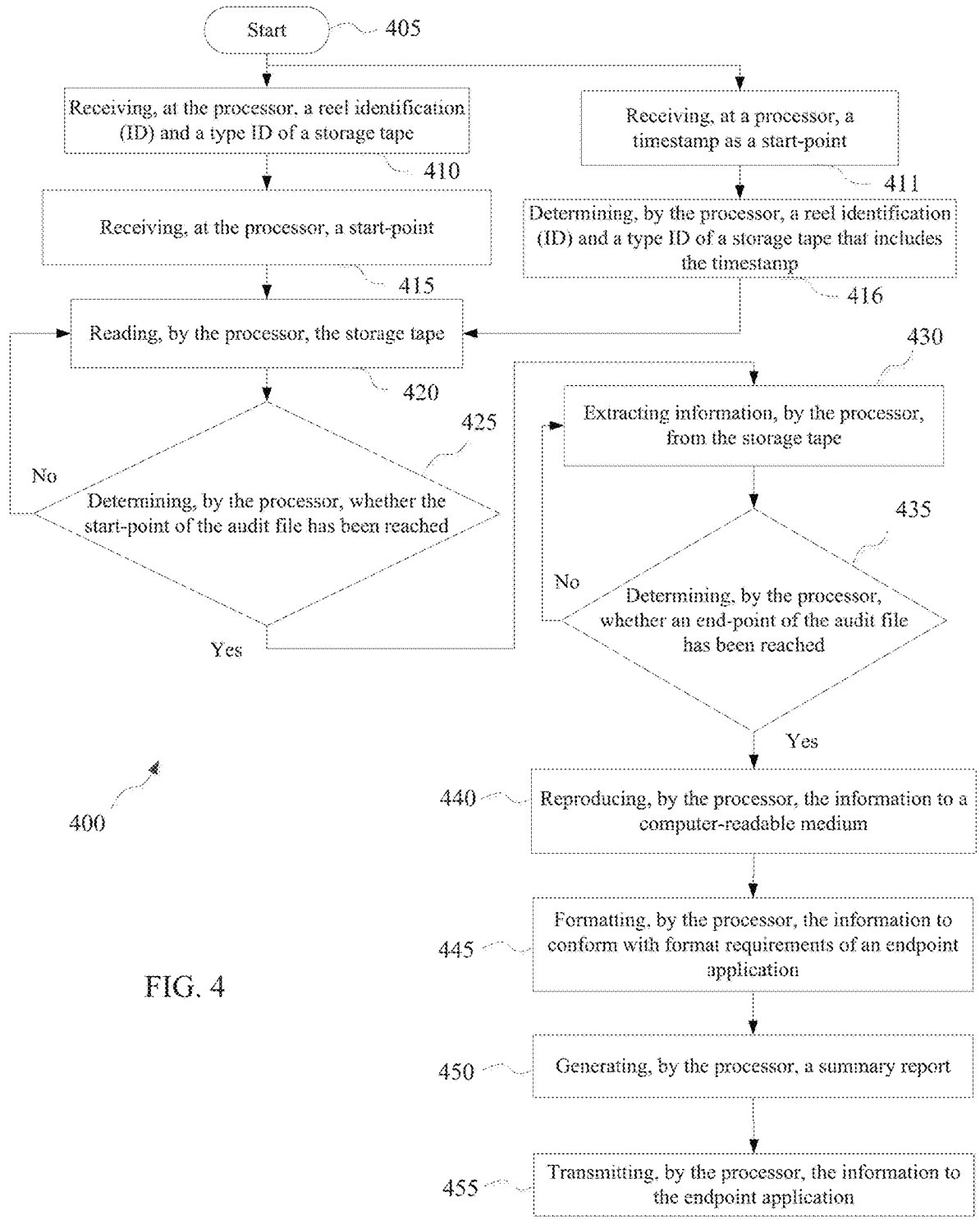
FIG. 4 is a flow chart illustrating a method of extracting information from a storage tape according to one embodiment of the disclosure.
Figure 5A:
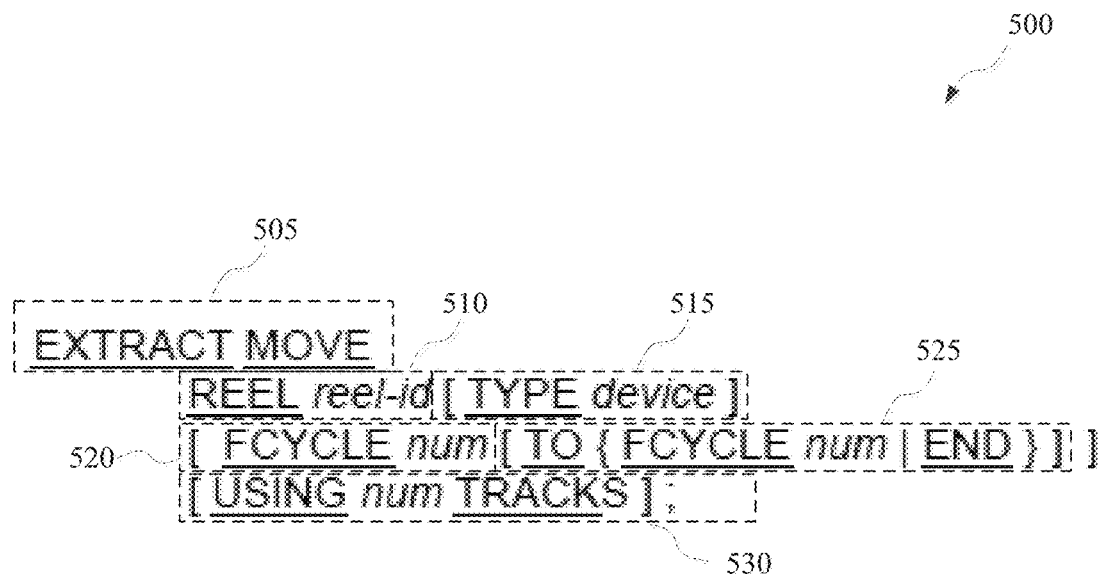
FIG. 5A is an example of an instruction that extracts information from a storage tape according to one embodiment of the disclosure.
Figure 5B:
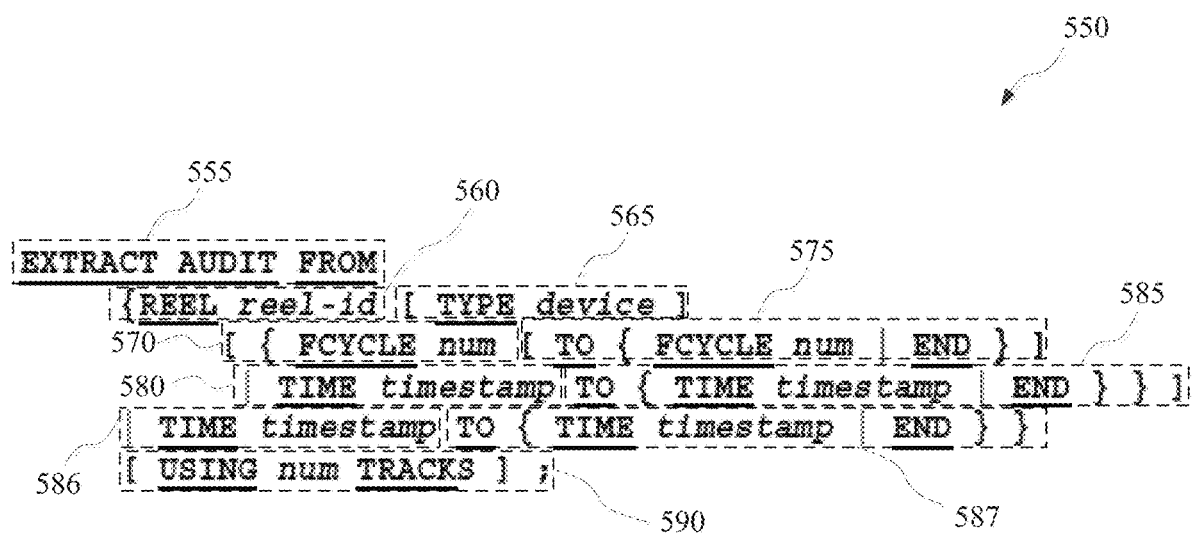
FIG. 5B is an example of an instruction that extracts information from a storage tape according to one embodiment of the disclosure.

FIG. 4 is a flow chart illustrating a method 400 of extracting information from a storage tape according to one embodiment of the disclosure. The method 400 may apply to the methods, apparatuses, and systems that extract information from storage tapes 115 shown in FIG. 1. The method 400 may be included in the working process 200 shown in FIG. 2. The method 400 may be used in part of or in combination with the method 300 shown in FIG. 3. The method 400 may include the example 500 of an instruction to extract information from a storage tape as shown in FIG. 5A and FIG. 5B. The method 400 may include the example 600 of an instruction to extract information from a storage tape as shown in FIG. 6. The method 400 may include the example 700 of an instruction to extract information from a storage tape as shown in FIG. 7. The method 400 may be included in the computer network 800 shown in FIG. 8 The method 400 may be included in the computer system 900 shown in FIG. 9. The method 400 may be included in the server 1000 shown in FIG. 10A and/or the server 1050 shown in FIG. 10B.

As shown in FIG. 4, the method 400 starts at block 405. The method 400 proceeds to either block 410 or block 411. If the method 400 proceeds to block 410, which includes receiving, at the processor, a reel identification (ID) and a device type ID of a storage tape, the method 400 further proceeds to block 415, which includes receiving, at the processor, a start-point. If the method 400 proceeds to block 411, which includes receiving, at a processor, a timestamp as a start-point, the method 400 further proceeds to block 416, which includes determining, by the processor, a reel identification (ID) and a type ID of a storage tape. The method 400 proceeds to block 420, which includes reading, by the processor, the storage tape. The method 400 proceeds to block 425, which includes determining, by the processor, whether a start-point of the audit file has been reached. The method 400 proceeds to block 430, which includes extracting information, by the processor, from the storage tape. The method 400 proceeds to block 435, which includes determining, by the processor whether an end-point of the audit file has been reached. The method 400 proceeds to block 440, which includes reproducing, by the processor, the information to the computer-readable medium. The method 400 proceeds to block 445, which includes formatting, by the processor, the information to conform with format requirements of an endpoint application, e.g., an activity log analyzing tool and or a storage tape. The method 400 proceeds to block 450, which includes generating, by the processor, a summary report. The method 400 proceeds to block 455, which includes transmitting, by the processor, the information to the endpoint application.

At block 410, the method 400 receives, at the processor, a reel ID and the device type ID of a storage tape. In one embodiment, the reel ID and the device type ID are specified by a user through an instruction. In another embodiment, other types of identifying information, other than reel ID or device type ID, may be used at block 410 to identify a storage tape.

At block 411, the processor receives a timestamp as a start-point. In one embodiment, the processor may receive a timestamp as a start-point because a user specifies the timestamp in an instruction. Block 411 followed by block 416 may be used as an alternative embodiment as block 410 followed by block 415. The embodiment of block 411 followed by 416 may be useful when a user knows the time period of the audit trail that he/she wants to review, but does not know the identification of the storage tape that contains the time period at interest.

At block 415, the method 400 receives, at the processor, a start-point. In one embodiment, the start-point may be a file ID specified by a user through an instruction. In another embodiment, the file ID may be specified using an F-cycle number, a position number, an audit trail serial number, a trail block sequence number (TBSN), a time point, a timestamp, a start of reel, or the like.

At block 416, the processor automatically determines a reel ID and a type ID of a storage tape that includes the timestamp. In one embodiment, block 416 allows a user to extract the audit trail at interest without knowing the ID of the reel and the type ID of a storage tape.

At block 420, the method 400 reads the storage tape. In one embodiment, the method 400 may read the storage tape from a beginning of a storage tape. In one embodiment, the method 400 may read the storage tape from a beginning of an audit trail. In one embodiment, the method 400 may read the storage tape from a beginning of an F-cycle. In one embodiment, the method 400 may read the storage tape from a beginning of a trail block. In one embodiment, the method 400 may read the storage tape from a beginning of a suitable file partition of the storage tape.

At block 425, the method 400 determines, by the processor, whether a start-point of the audit file has been reached. At 425, if the start-point is not reached, the method proceeds to block 420, meaning the method 400 keeps reading until it reaches a start-point. At block 425, if the start-point has been reached, the method 400 proceeds to block 430. In one embodiment, the start-point may be specified using an F-cycle number, a position number, an audit trail serial number, a trail block sequence number (TBSN), a time point, or the like.

At block 430, the method 400 extracts information, by the processor, from the storage tape. In one embodiment, the extracted information may or may not be stored in a computer-readable medium temporarily.

At block 435, the method 400 determines, by the processor, whether an end-point of the audit file has been reached. In one embodiment, the end-point is specified by the user using an F-cycle number, a position number, an audit trail serial number, a trail block sequence number (TBSN), a time point, a timestamp, a start of reel, or the like. In one embodiment, the end-point is specified at the same time the start-point is specified, e.g., at block 415. In some embodiments, an end-point is not specified by a user and is presumed by the method 400 to be the end of an F-cycle, audit trail, trail block, certain partition of the storage tape, end of the storage tape, or the like.

At block 440, the method 400 reproduces, by the processor, the information to a computer-readable medium. In one embodiment, the computer-readable medium may be non-transient computer-readable memory. In another embodiment, the reproduction of the information to the computer-readable medium may be deleted after the information is transmitted to an endpoint, for example the endpoints in block 220 as shown in FIG. 2.

At block 445, the method formats and/or reorganizes the format of the extracted information to conform with format requirements of an endpoint application, e.g., an activity log analyzing tool and/or a storage tape. In one embodiment, the activity log analyzing tool may be FSAH, IRU, LA, ALOG, TQLA, or the like. It is noted that the previously mentioned log analyzing tools are exemplary only. In one embodiment, the activity log analyzing tool may be any log reviewing software developed by any individual, company, or organization suitable for the purpose. It is also noted, at block 445, that the formatting of the extracted information is not limited to conform with log analyzing tools. In one embodiment, the formatting of the extracted information may be for reconstructing storage tapes, e.g., block 220 as shown in FIG. 2.

At block 450, the method generates, by the processor, a summary report. In one embodiment, the summary report is a report of the steps the method 400 has performed. In one embodiment, the summary report may include a table, identification of a section (a position, an F-cycle number, etc) of an audit trail, time stamps of the section of the audit trail, a starting trail block sequence number (TBSN), a status of the section of the audit trail, or the like. In one embodiment, the status may be "partial," meaning the extracted section is continued from another storage tape. In one embodiment, the status may be "extracted," meaning the extracted section is complete. In another embodiment, the status may be "incomplete," meaning the extracted section is not complete on the current storage tape and may continue to another storage tape.

At block 455, the transmission of information to the endpoint application may be done through a data connection.

It is noted that the blocks shown in FIG. 4 do not indicate the chronological sequence to be performed. For example, in one embodiment, formatting extracted information at block 445 may be performed earlier than reproducing the information to a computer-readable medium at 440. In yet another embodiment, both of blocks 440 and 445 may be performed after block 430 yet before the block 435.

FIG. 5A is an example 500 of an instruction that extracts information from a storage tape according to one embodiment of the disclosure. The example 500 may apply to the methods, apparatuses, and systems that extract information from storage tapes 115 shown in FIG. 1. The example 500 may be included in the working process 200 shown in FIG. 2. The example 500 may be used in part of or in combination with the method 300 shown in FIG. 3. The example 500 may be used in part of or in combination with the method 400 shown in FIG. 4. The example 500 may be used in part or in combination with the example 600 as shown in FIG. 6. The example 500 may be used in part or in combination with the example 700 as shown in FIG. 7. The example 500 may be executed on the computer network 800 shown in FIG. 8 The example 500 may be executed on the computer system 900 shown in FIG. 9. The example 500 may be executed on the server 1000 shown in FIG. 10A and/or the server 1050 shown in FIG. 10B.

In FIG. 5A and FIG. 5B, symbol "_" means required text, if the instruction is used. Symbol "[ ]" means optional instruction. Symbol "{|}" means users have to choose one from a plurality of options, if the instruction is used.

As shown in FIG. 5A, the example 500 includes the instruction EXTRACT MOVE 505. In one embodiment, the instruction EXTRACT MOVE 505 may read and extract the information from a storage tape. In one embodiment, the instruction EXTRACT MOVE 505 may reformat the extracted information. In one embodiment, the instruction EXTRACT MOVE 505 may reproduce the extracted information. In one embodiment, the instruction EXTRACT MOVE 505 may generate a summary report of the extraction process.

As shown in FIG. 5A, the example 500 includes the instruction REEL reel-id 510. In one embodiment, the instruction REEL reel-id 510 may specify an serial number of the reel of the storage tape. In one embodiment, the reel-id may be numbers and/or characters.

As shown in FIG. 5A, the example 500 may include the instruction TYPE device 515. In one embodiment, the instruction TYPE device 515 may specify a device type of the storage tape. In one embodiment, the device may be numbers and/or characters.

As shown in FIG. 5A, the example 500 may include the instruction FCYCLE num 520. In one embodiment, the instruction FCYCLE num 520 may specify a start-point for extracting the information from a storage tape. In one embodiment, a storage tape may include a plurality of F-cycles. In one embodiment, a storage tape may include up to 999 F-cycles. In one embodiment, a F-cycle number may be used to refer an audit trail number.

As shown in FIG. 5A, the example 500 may include the instruction TO {FCYCLE num|END} 525. In one embodiment, the instruction TO {FCYCLE num|END} 525 may specify an end-point for extracting information from a storage tape. In one embodiment, the instruction TO {FCYCLE num|END} 525 may mean that a user can specify an end-point by FCYCLE num, or by END. In one embodiment, FCYCLE num may mean an F-cycle number, and the extraction process may end at the end of the specified F-cycle. In another embodiment, END may mean an end of F-cycle, and the extraction process may end at the end of the F-cycle specified at 520. In another embodiment, END may mean an end of the tape, and the extraction process may terminate at the end of the storage tape.

As shown in FIG. 5A, the example 500 may include the instruction USING num TRACKS 530. In one embodiment, the instruction USING num TRACKS 530 may specify a maximum track size of the mass storage file created for the extracted information. In one embodiment, if the num is greater than 262143, the value of the num is converted to positions by dividing num with 64 and the next whole integer value is used as a position granularity value. For example, 262145 tracks may be converted to 4097 positions.

As shown in FIG. 5B, the example 550 includes instruction EXTRACT AUDIT FROM 555. In one embodiment, the instruction EXTRACT AUDIT FROM 555 may read and extract the information from a storage tape. In one embodiment, the instruction EXTRACT AUDIT FROM 555 may reformat the extracted information. In one embodiment, the instruction EXTRACT AUDIT FROM 555 may reproduce the extracted information. In one embodiment, the instruction EXTRACT AUDIT FROM 555 may generate a summary report of the extraction process.

As shown in FIG. 5B, the example 550 includes the instruction REEL reel-id 560. In one embodiment, the instruction REEL reel-id 560 may specify an serial number of the reel of the storage tape. In one embodiment, the reel-id may be numbers and/or characters.

As shown in FIG. 5B the example 550 may include the instruction TYPE device 565. In one embodiment, the instruction TYPE device 565 may specify a device type of the storage tape. In one embodiment, the device may be numbers and/or characters.

As shown in FIG. 5B, the example 550 may include the instruction FCYCLE num 570. In one embodiment, the instruction FCYCLE num 570 may specify a start-point for extracting the information from a storage tape. In one embodiment, a storage tape may include a plurality of F-cycles. In one embodiment, a storage tape may include up to 999 F-cycles. In one embodiment, a F-cycle number may be used to refer an audit trail number.

As shown in FIG. 5B, the example 550 may include the instruction TO {FCYCLE num|END} 575. In one embodiment, the instruction TO {FCYCLE num|END} 575 may specify an end-point for extracting information from a storage tape. In one embodiment, the instruction TO {FCYCLE num|END} 575 may mean that a user can specify an end-point by FCYCLE num, or by END. In one embodiment, FCYCLE num may mean an F-cycle number, and the extraction process may end at the end of the specified F-cycle. In another embodiment, END may mean an end of F-cycle, and the extraction process may end at the end of the F-cycle specified at 570. In another embodiment, END may mean an end of the tape, and the extraction process may terminate at the end of the storage tape.

As shown in FIG. 5B, the example 550 may include the instruction TIME timestamp 580. In one embodiment, the instruction TIME timestamp 580 is used in alternative to the instruction FCYCLE num 570. In one embodiment, the instruction TIME timestamp 580 may specify a time as a start-point for extracting the information from a storage tape. In one embodiment, the start-point for extracting the information from the storage tape may be determined according to the timestamp, e.g., the start-point may be a beginning of a Fcycle that covers the timestamp. In one embodiment, the timestamp may be in the format of year/month/date/hour/minute/second, e.g., 2015/06/15 14:40:29.

As shown in FIG. 5B, the example 550 may include the instruction TO {TIME timestamp|END} 585. In one embodiment, the instruction TO {TIME timestamp|END} 585 is used in alternative to the instruction TO (FCYCLE num|END) 575. In one embodiment, the instruction TO {TIME timestamp|END} 585 may specify a time as an end-point for extracting the information from a storage tape. In one embodiment, the end-point for extracting the information from the storage tape may be determined according to the timestamp, e.g., the end-point may be an end of a Fcycle that covers the timestamp. In one embodiment, the timestamp may be in the format of year/month/date/hour/minute/second, e.g., 2015/06/15 14:40:52.

As shown in FIG. 5B, the example 550 may include the instruction TIME timestamp 586. In one embodiment, the instruction TIME timestamp 586 may be used in alternative to REEL reel-id 560. In one embodiment, the instruction TIME timestamp 586 may specify a time as a start-point for extracting the information from a storage tape, wherein the reel identification, the device type, and the fcycle number can all be automatically determined by the processor executing the instructions. In one embodiment, the reel identification, the device type, and the fcycle number can be determined by reading the header file and/or the metadata file associated with the audit trail. This embodiment increases the convenience for a user because the user only needs to know the time period at interest; knowledge about reel identification, device type, and/or fcycle number are not required. In another embodiment, the start-point for extracting the information from the storage tape may be determined according to the timestamp, e.g., the start-point may be a beginning of a Fcycle that covers the timestamp. In one embodiment, the timestamp may be in the format of year/month/date/hour/minute/second, e.g., 2015/06/15 14:40:29.

As shown in FIG. 5B, the example 550 may include the instruction TO {TIME timestamp|END} 587. The instruction TO {TIME timestamp|END} 587 is used in conjunction to TIME timestamp 586. In one embodiment, the instruction TO {TIME timestamp|END} 585 may specify a timestamp as an end-point for extracting the information from a storage tape. In one embodiment, the end-point for extracting the information from the storage tape may be determined according to the timestamp, e.g., the end-point may be an end of a Fcycle that covers the timestamp. In one embodiment, the timestamp may be in the format of year/month/date/hour/minute/second, e.g., 2015/06/15 14:40:52.

As shown in FIG. 5B, the example 550 may include the instruction USING num TRACKS 590. In one embodiment, the instruction USING num TRACKS 590 may specify a maximum track size of the mass storage file created for the extracted information. In one embodiment, if the num is greater than 262143, the value of the num is converted to positions by dividing num with 64 and the next whole integer value is used as a position granularity value. For example, 262145 tracks may be converted to 4097 positions.

In another embodiment, the instruction REEL reel-id 510, 560 and the instruction TYPE device 515, 565 may not be required, respectively in examples 500, 550. Instead, in one embodiment, only FCYCLE num may be required to specify a start-point and/or an end-point for extracting information in a storage tape. In yet another embodiment, only TIME timestamp is required to specify a start-point and/or an end-point for extracting information in a storage tape. In another embodiment, the information of reel-id and device type can be automatically extracted without user input from a history file associated with the specific storage tape. The embodiment that does not require reel-id and device type may be more convenient for a user, because a user may not have the information of reel-id and device type offhand. Yet, a user may often know the time point the database service is interrupted. Therefore, the embodiment, that only requires TIME timestamp to specify a start-point and/or an end-point may be a more intuitive syntax to a user for extracting the information from the storage tape.

FIG. 6 is an example 600 of an instruction that extracts all F-cycles from a storage tape according to one embodiment of the disclosure. The example 600 may apply to the methods, apparatuses, and systems that extract information from storage tapes 115 shown in FIG. 1. The example 600 may be included in the working process 200 shown in FIG. 2. The example 600 may be used in part of or in combination with the method 300 shown in FIG. 3. The example 600 may be used in part of or in combination with the method 400 shown in FIG. 4. The example 600 may be used in part or in combination with the examples 500 and 550 as shown in FIG. 5A and FIG. 5B, respectively. The example 600 may be used in part or in combination with the example 700 as shown in FIG. 7. The example 600 may be executed on the computer network 800 shown in FIG. 8. The example 600 may be executed on the computer system 900 shown in FIG. 9. The example 600 may be executed on the server 1000 shown in FIG. 10A and/or the server 1050 shown in FIG. 10B.

As shown in FIG. 6, the example 600 includes instruction extract move reel t17464 type vts 605. In one embodiment, the instruction extract move reel t17464 type vts 605 is an embodiment of the example 500. In one embodiment, the instruction extract move reel t17464 type vts 605 may mean extracting all Fcycles from the storage tape identified by the reel number t17464 and type vts.

As shown in FIG. 6, the example 600 includes the instruction act appl appone 610. In one embodiment, the instruction act appl appone 610 may instruct a processor to execute all commands entered but not yet executed up to and including act. The text of appl appone may specify the application group associated with the current IRU session.

As shown in FIG. 6, the example 600 includes the report 615 ACT set is for application 1. The report 615 provides information about the execution of the instruction ACT.

As shown in FIG. 6, the example 600 includes the report 620 Audit reel T17464 assigned. The report 620 provides information about the execution of the instruction extract move. In one embodiment, the report 620 may indicate that the processor has assigned storage tape T17464 for extraction.

As shown in FIG. 6, the example 600 includes the report 630. In one embodiment, the report 630 is an update of the instruction extract move. The report 630 includes an F-cycle column 625. As shown in FIG. 6, the F-cycles 394-398 are being extracted from the storage tape T17464. The report 630 includes a mass storage file name column 635. As shown in FIG. 6, the mass storage files created for storing the extracted information have filenames VTST17464*IRU$EX01-394, VTST17464*IRU$EX01-

395, . . . so on and so forth with increasing number. As shown in FIG. 6, one F-cycle maps to one mass storage file. It is noted example 600 is exemplary only. One F-cycle may map to more than one mass storage files, or vice versa.

As shown in FIG. 6, the example 600 includes the report 640 showing Audit reel T17464 freed. The report 640 provides information about the execution of the instruction extract move. In one embodiment, the report 640 indicates that the processor has released the storage tape T17464 from extraction.

As shown in FIG. 6, the example 600 includes the report 645 showing Timestamp of last block extracted: 2015/06/15 14:40:58 CDT. In one embodiment, the report 640 indicates the time stamp of the last audit trail block is 2015/06/15 14:40:58 Central Day Time. In another embodiment, the report 645 may also include the time stamp of the first audit trail block, for example: Timestamp of first block extracted: 2015/06/15 14:40:25 CDT.

As shown in FIG. 6, the example 600 includes the summary report 650. The summary report 650 provides a summary of the execution of the instruction extract move. The summary report 650 includes a position column 655, an Fcycle column 660, a start time column 665, a start TBSN column 670, and a Status column 675. As shown in FIG. 6, one position maps to one Fcycle. Start time column 665 shows the starting time stamp of the referenced Fcycle.

As shown in FIG. 6, Fcycle 394 starts from TBSN 9619 and the status is shown as "partial." In one embodiment, the "partial" status may indicate that Fcycle 394 is continued from another storage tape (e.g., T17463). Therefore, Fcycle 394 does not have a complete set of trail blocks (e.g., 183/2424 trail blocks as shown in FIG. 6). As shown in FIG. 6, Fcycles 395-397 have a status of "Extracted." In one embodiment, the "Extracted" status may indicate that Fcycles 395-397 are fully extracted. In one embodiment, the "Extracted" status may also indicate that Fcycles 395-397 are complete Fcycles and have a full range of trail blocks (e.g., TBSN 9802-17075). As shown in FIG. 6, the Fcycle 398 has a status of "Incomplete." In one embodiment, status "Incomplete" may indicate that the audit trail that includes Fcycle 398 is not complete on the current storage tape (e.g., T17464) and may continue to a next storage tape (e.g., T17465).

It is noted that example 600 shown in FIG. 6 is exemplary only and provides no limitation to the scope of the disclosure.

FIG. 7 is an example 700 of an instruction that extracts a single F-cycle from a storage tape according to one embodiment of the disclosure. The example 700 may apply to the methods, apparatuses, and systems that extract information from storage tapes 115 shown in FIG. 1. The example 700 may be included in the working process 200 shown in FIG. 2. The example 700 may be used in part of or in combination with the method 300 shown in FIG. 3. The example 700 may be used in part of or in combination with the method 400 shown in FIG. 4. The example 700 may be used in part or in combination with the examples 500 and 550 as shown in FIG. 5A and FIG. 5B, respectively. The example 700 may be used in part or in combination with the example 600 as shown in FIG. 6. The example 600 may be executed on the computer network 800 shown in FIG. 8 The example 700 may be executed on the computer system 900 shown in FIG. 9. The example 700 may be executed on the server 1000 shown in FIG. 10A and/or the server 1050 shown in FIG. 10B.

As shown in FIG. 7, the example 700 includes instruction extract audit from time 2015/06/15 14:40:37 705. In one embodiment, the instruction extract audit from time 2015/06/15 14:40:37 705 is an embodiment of the example 500. In one embodiment, the instruction extract audit from time 2015/06/15 14:40:37 705 may mean extracting an audit trail starting from 2015/06/15 14:40:37.

As shown in FIG. 7, the example 700 includes the instruction act appl appone 710. In one embodiment, the instruction act appl appone 710 may instruct a processor to execute all commands entered but not yet executed up to and including act. The text of appl appone may specify the application group associated with the current IRU session.

As shown in FIG. 7, the example 700 includes the report 715 ACT set is for application 1. The report 715 provides information about the execution of the instruction ACT.

As shown in FIG. 7, the example 700 includes the report 720 Audit reel T17464 assigned. The report 720 provides information about the execution of the instruction extract move. In one embodiment, the report 720 may indicate that the processor has assigned storage tape T17464 for extraction.

As shown in FIG. 7, the example 700 includes the report 725 Extracting F-cycle 396 to file VTST17464*IRU$EX01-396. In one embodiment, one F-cycle (e.g., F-cycle 396) may map to one mass storage file (e.g., mass storage file VTST17464*IRU$EX01-396). In one embodiment, the last three digits of the file name of the mass storage file may match with the F-cycle number, e.g., 396.

As shown in FIG. 7, the example 700 includes the report 730 showing Audit reel T17464 freed. The report 730 provides information about the execution of the instruction extract move. In one embodiment, the report 730 indicates that the processor has freed the storage tape T17464 from extraction.

As shown in FIG. 7, the example 700 includes the report 735 showing Timestamp of last block extracted: 2015/06/15 14:40:44 CDT. In one embodiment, the report 735 indicates the time stamp of the last audit trail block is 2015/06/15 14:40:44 Central Day Time. In another embodiment, the report 735 may also include the time stamp of the first audit trail block, for example: Timestamp of first block extracted: 2015/06/15 14:40:25 CDT.

As shown in FIG. 7, the example 700 includes the summary report 740. The summary report 740 provides a summary of the execution of the instruction extract move. The summary report 740 includes a position column 745, an Fcycle column 750, a start time column 755, a start TBSN column 760, and a Status column 765. As shown in FIG. 7, one position maps to one Fcycle. The Start time column 755 shows the starting time stamp of the referenced Fcycle.

As shown in FIG. 7, Fcycle 394 starts from TBSN 9619 and the status is shown as "Skipped." In one embodiment, "skipped" status may indicate that Fcycle 394 is skipped over and not fully read or extracted. In one embodiment, the first TBSN 9619 of Fcycle 394 may be at least partially read because Fcycle 394 is the first very first Fcycle of the storage tape t17464. In contrast, as shown in FIG. 7, Fcycle 395 is completely skipped where TBSN is shown as "0" because Fcycle 395 is neither the first block of the storage tape nor the specified Fcycle to be extracted (Fcycle 396).

As shown in FIG. 7, Fcycle 396 starts from TBSN 12226 and the status is shown as "Extracted." In one embodiment, the "Extracted" status may indicate that Fcycle 396 is fully extracted. In one embodiment, the "Extracted" status may also indicate that Fcycles 396 is a complete Fcycle and has a full scale of trail blocks (e.g., 2424/2424 trail blocks).

It is noted that example 700 shown in FIG. 7 is exemplary only and provides no limitation to the scope of the disclosure.

Figure 8:
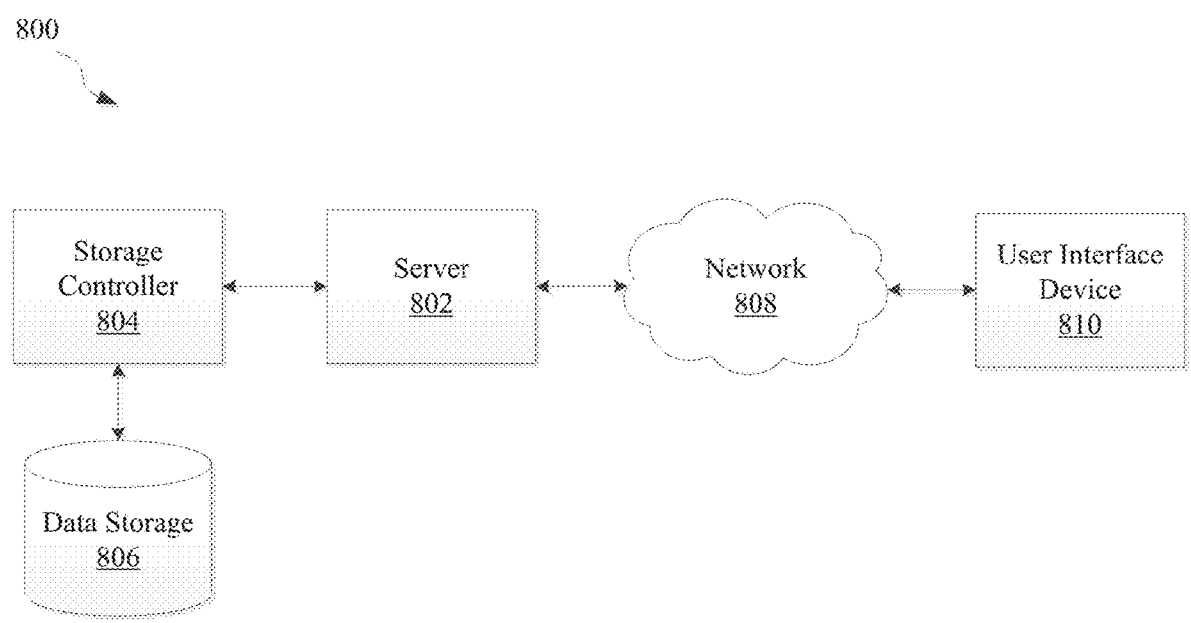
FIG. 8 is a block diagram illustrating a computer network according to one embodiment of the disclosure.

FIG. 8 illustrates a computer network 800 for obtaining access to database files in a computing system according to one embodiment of the disclosure. The system 800 may include a server 802, a data storage device 806, a network 808, and a user interface device 810. The server 802 may also be a hypervisor-based system executing one or more guest partitions hosting operating systems with modules having server configuration information. In a further embodiment, the system 800 may include a storage controller 804, or a storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other mobile communication device having access to the network 808. In a further embodiment, the user interface device 810 may access the Internet or other wide area or local area network to access a web application or web service hosted by the server 802 and may provide a user interface for enabling a user to enter or receive information.

The network 808 may facilitate communications of data between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate sever (not shown). For example, in a cloud application the user interface device 810 may access an application server. The application server fulfills requests from the user interface device 810 by accessing a database management system (DBMS). In this embodiment, the user interface device 810 may be a computer or phone executing a Java application making requests to a JBOSS server executing on a Linux server, which fulfills the requests by accessing a relational database management system (RDMS) on a mainframe server.

Figure 9:
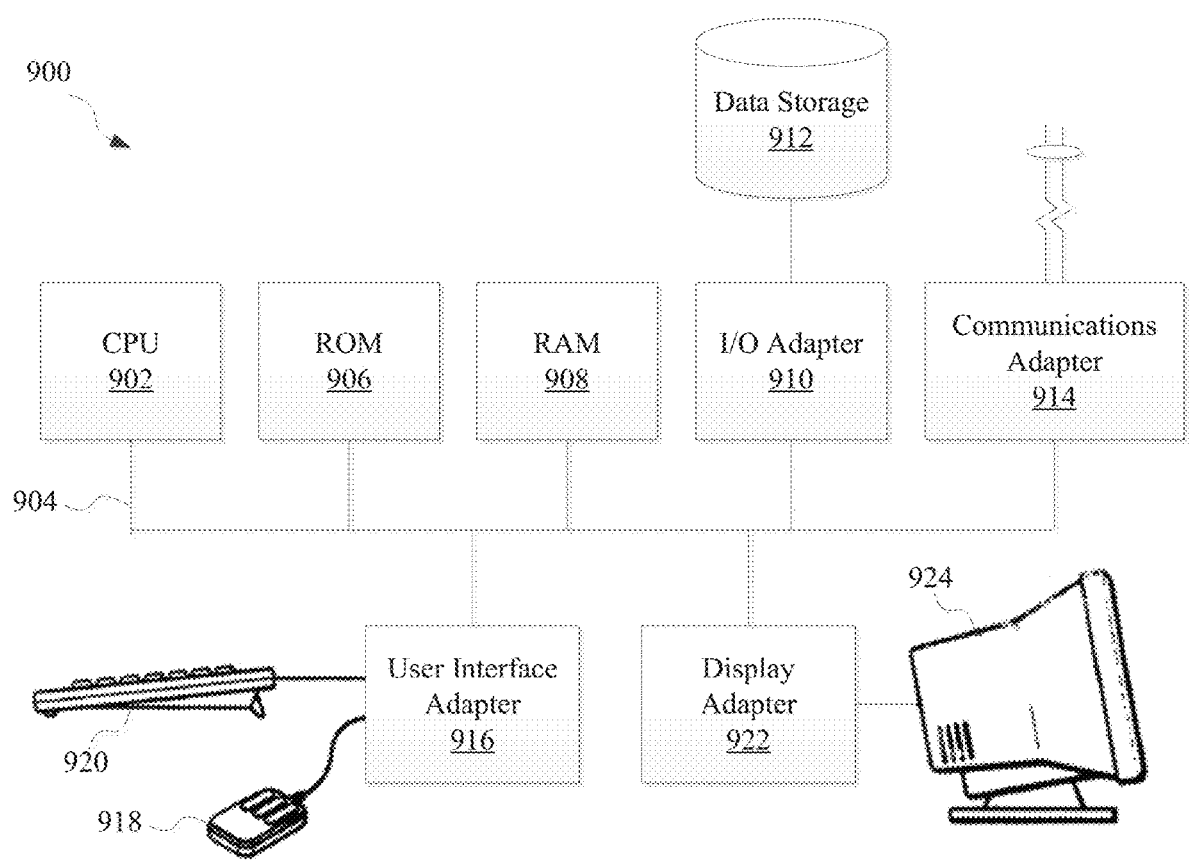
FIG. 9 is a block diagram illustrating a computer system according to one embodiment of the disclosure.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an I/O adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The user interface adapter 916 couples user input devices, such as a keyboard 920, a pointing device 918, and/or a touch screen (not shown) to the computer system 900. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 802 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 900 may be virtualized for access by multiple users and/or applications.

Figure 10A:
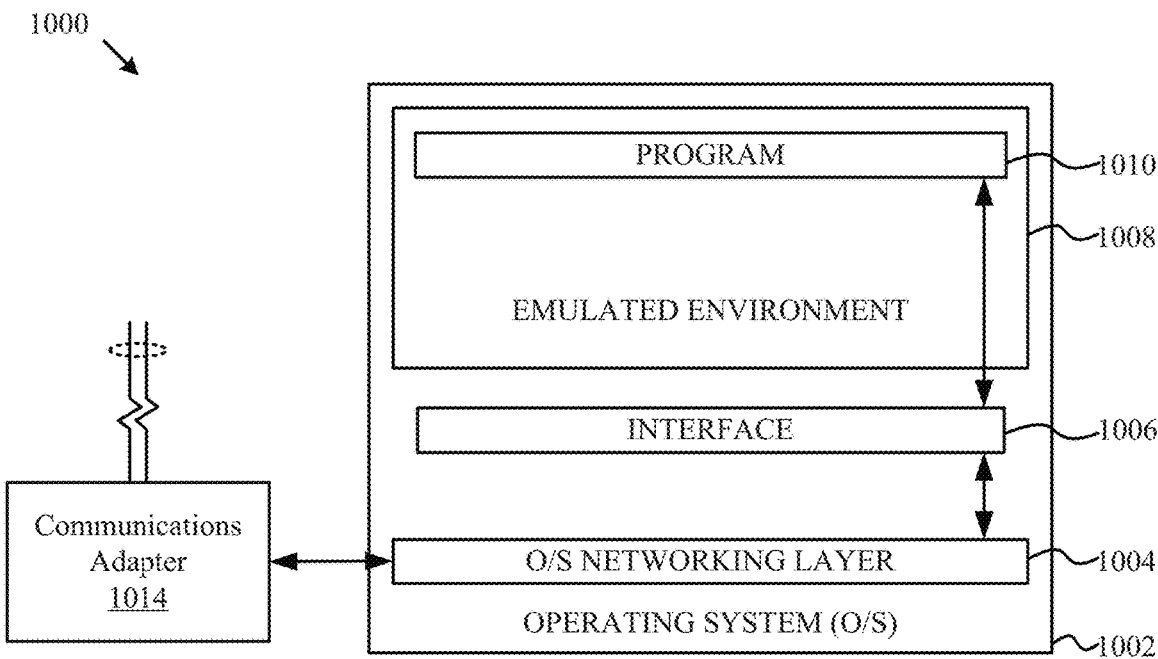
FIG. 10A is a block diagram illustrating a server hosting an emulated software environment for virtualization according to one embodiment of the disclosure.

FIG. 10A is a block diagram illustrating a server 1000 hosting an emulated software environment for virtualization according to one embodiment of the disclosure. An operating system 1002 executing on a server 1000 includes drivers for accessing hardware components, such as a networking layer 1004 for accessing the communications adapter 1014. The operating system 1002 may be, for example, Linux or Windows. An emulated environment 1008 in the operating system 1002 executes a program 1010, such as Communications Platform (CPComm) or Communications Platform for Open Systems (CPCommOS). The program 1010 accesses the networking layer 1004 of the operating system 1002 through a non-emulated interface 1006, such as extended network input output processor (XNIOP). The non-emulated interface 1006 translates requests from the program 1010 executing in the emulated environment 1008 for the networking layer 1004 of the operating system 1002.

Figure 10B:
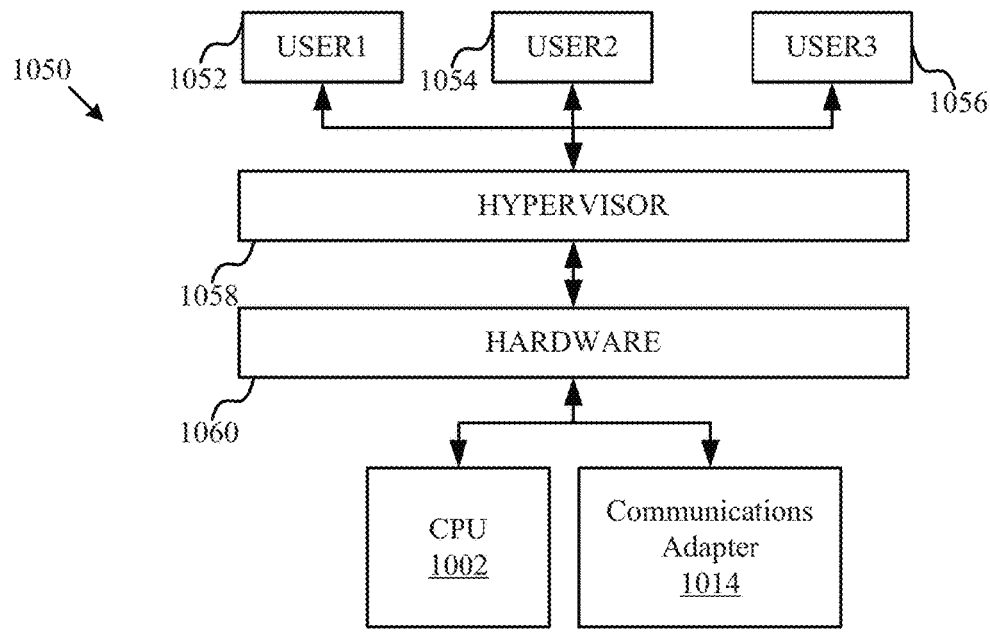
FIG. 10B is a block diagram illustrating a server hosting an emulated hardware environment according to one embodiment of the disclosure.

In another example, hardware in a computer system may be virtualized through a hypervisor. FIG. 10B is a block diagram illustrating a server 1050 hosting an emulated hardware environment according to one embodiment of the disclosure. Users 1052, 1054, 1056 may access the hardware 1060 through a hypervisor 1058. The hypervisor 1058 may be integrated with the hardware 1058 to provide virtualization of the hardware 1058 without an operating system, such as in the configuration illustrated in FIG. 10A. The hypervisor 1058 may provide access to the hardware 1058, including the CPU 1002 and the communications adaptor 1014.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A machine-based method for reading activity log information from a computer readable medium data, the method comprising:
   receiving, at a processor, a first timestamp;
   determining, at the processor, a start-point for extracting information from the computer readable medium according to the first timestamp;
   extracting the information, by the processor, from the computer readable medium starting at the start-point;
   receiving, at the processor, a second timestamp;
   determining, by the processor, whether an end-point of the information from the computer readable medium has been reached, wherein the end-point of the information is determined according to the second timestamp;
   writing, by the processor, the information extracted to a second computer-readable medium; and
   formatting, by the processor, the information extracted to conform with format requirements of an endpoint application.

2. The method according to claim 1, further including transmitting, by the processor, the information to the endpoint application.

3. The method according to claim 1, wherein the start-point is at the first timestamp and the end-point is at the second timestamp.

4. The method according to claim 1, further including reading, by the processor, the storage tape; and
   determining, by the processor, whether the start-point of the information has been reached.

5. The method according to claim 1, further including generating, by the processor, a summary report.

6. The method of claim 1, wherein determining, at the processor, a start-point for extracting information from the computer readable medium includes extracting information from a storage tape.

7. A computer program product for reading activity log information from a computer readable medium, comprising:
   a non-transitory computer-readable medium comprising instructions which, when executed by a processor of a computing system, cause the processor to perform operations that include:
   receiving a first timestamp;
   determining a start-point for extracting information from the computer readable medium according to the first timestamp;
   extracting the information from the computer readable medium starting at the start-point;
   receiving a second timestamp;
   determining whether an end-point of the information has been reached, wherein the end-point of the information is determined according to the second timestamp;
   writing the information extracted to a second computer-readable medium; and
   formatting the information extracted to conform with format requirements of an endpoint application.

8. The computer program product of claim 7, wherein the medium further includes instruction to cause the processor to perform:
   transmitting the information to the endpoint application.

9. The computer program product of claim 7, wherein the start-point is at the first timestamp and the end-point is at the second timestamp.

10. The computer program product of claim 7, wherein the medium further includes instruction to cause the processor to perform operations including:
    reading the storage tape; and
    determining whether the start-point of the information has been reached.

11. The computer program product of claim 7, wherein the medium further includes instruction to cause the processor to perform:
    generating a summary report.

12. The computer program product of claim 7, wherein a computer readable medium is a storage tape.

13. An apparatus for reading activity log information from a computer readable medium, comprising:

a memory; and a processor coupled to the memory, the processor being configured to execute operations that include:

receiving a first timestamp;

determining a start-point for extracting information from the computer readable medium according to the first timestamp;

extracting the information from the computer readable medium starting at the start-point;

receiving a second timestamp;

determining whether an end-point of the information has been reached, wherein the end-point of the information is determined according to the second timestamp;

storing the information extracted to a second computer-readable medium; and formatting the information extracted to conform with format requirements of an endpoint application.

14. The apparatus of claim 13, wherein the processor is further configured to perform:

transmitting the information to the endpoint application.

15. The apparatus of claim 13, wherein the start-point is at the first timestamp and the end-point is at the second timestamp.

16. The apparatus of claim 13, wherein the processor is further configured to perform:

reading the storage tape; and determining whether the start-point of the information has been reached.

17. The apparatus of claim 13, wherein a computer readable medium is a storage tape.

* * * * *